United States Patent
Chouinard

[15] 3,664,099
[45] May 23, 1972

[54] LAWN MOWER ATTACHMENT

[72] Inventor: Joseph Henry Chouinard, 34 Broad St., East Hartford, Conn. 06118

[22] Filed: Oct. 12, 1970

[21] Appl. No.: 79,806

[52] U.S. Cl. ..............................56/13.3, 56/202, 56/DIG. 8
[51] Int. Cl. ......................................................A01d 35/22
[58] Field of Search .....................56/12.8, 13.3, 13.4, 16.4, 56/16.1, 16.6, DIG. 12, DIG. 8; 15/350, 351, 349, 79

[56] References Cited

UNITED STATES PATENTS

| | | | |
|---|---|---|---|
| 3,134,118 | 5/1964 | Chouinard | 15/79 |
| 3,201,819 | 8/1965 | Wilgus | 15/349 |
| 3,094,830 | 6/1963 | Leblanc | 56/198 |
| 2,632,989 | 3/1953 | Ross | 56/199 |
| 2,700,863 | 2/1955 | Etem | 15/340 |
| 2,669,078 | 2/1954 | Gregory | 56/DIG. 8 |
| 3,199,277 | 8/1965 | Moody | 56/202 |

*Primary Examiner*—Antonio F. Guida
*Attorney*—Bacon & Thomas

[57] ABSTRACT

A wheel supported attachment for a self-powered lawn mower is attached in trailing relation to the mower and a cylindrical brush, driven by power from the mower, sweeps grass cuttings and other debris upwardly into a hood in which a centrifugal blower operates to receive the material and blow it into an open-topped container removably mounted on the attachment.

5 Claims, 5 Drawing Figures

Patented May 23, 1972

INVENTOR
JOSEPH H. CHOUINARD
BY
Bacon & Thomas
ATTORNEYS

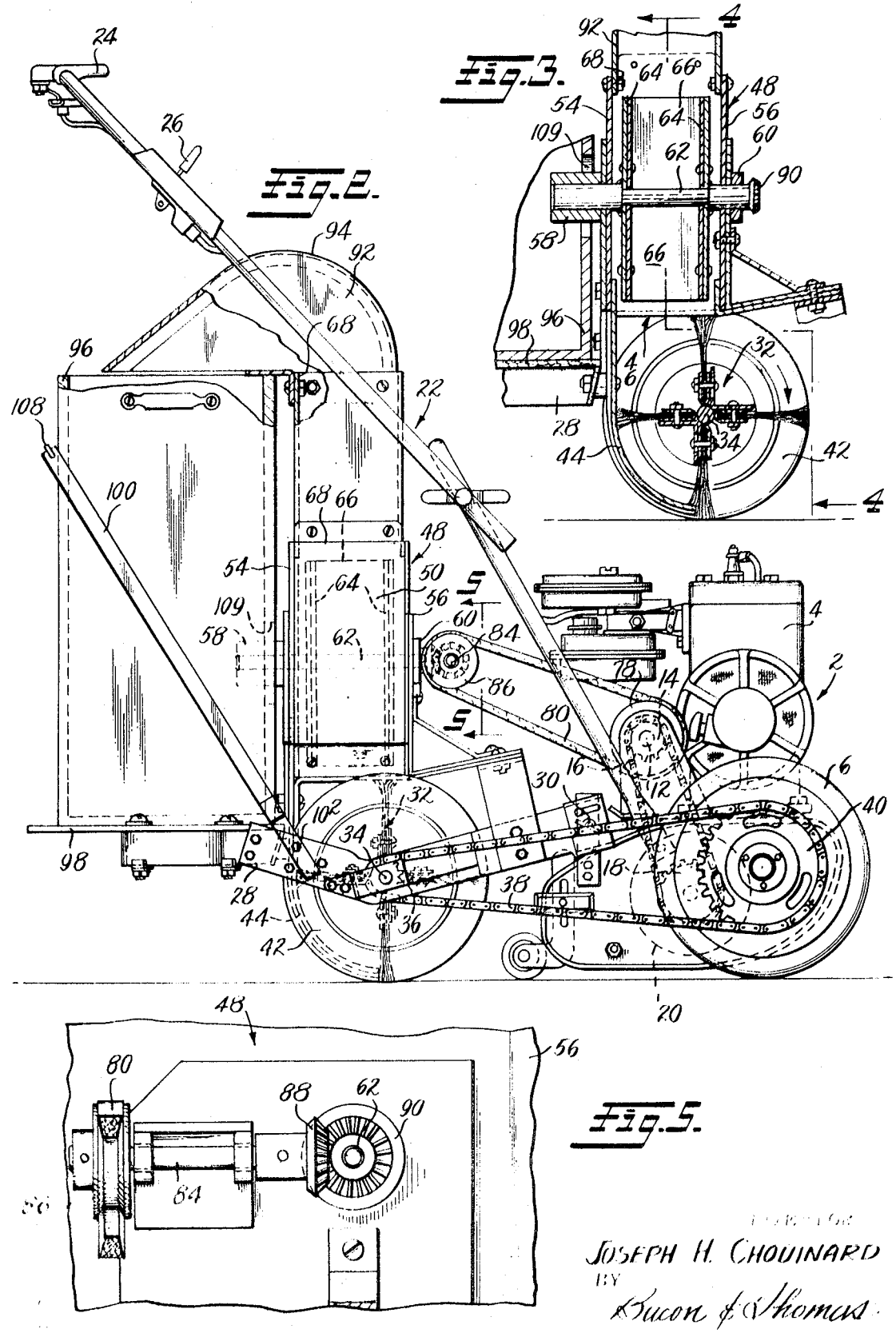

LAWN MOWER ATTACHMENT

BACKGROUND OF THE INVENTION

This invention is in the field of attachments for lawn mowers for receiving and gathering lawn cuttings and other debris.

Lawn mowers with attachments for gathering cuttings and debris have been provided heretofore but such attachments involve the use of simply a rotary brush or an air flow system from rotary-blade mowers, to pick up grass cuttings and direct them into a suitable container. The rotary blade mowers which use suction will gather most of the clippings but much debris, particularly very fine or heavier particles, remain on the ground and the efficiency of such systems depends on the height setting of the cutter blades. The rotary brushes of the other type merely project the engaged cuttings mechanically toward a container but the manner of delivering material to the container is such that only a small quantity of the cuttings can be collected before it is necessary to either empty a container or compact the same in the container. The rotary brushes, however, do an efficient job of sweeping the cut lawn.

SUMMARY OF THE INVENTION

The present invention comprises an attachment for a lawn mower, and particularly a reel-type mower, wherein a rotary brush extends across the swath cut by the mower, in trailing relation to the mower, to thereby sweep the cut lawn perfectly clean of cuttings and other debris. The material delivered by the rotary brush is directed to a blower which then blows the material into the top of a container carried by the attachment. This arrangement provides for more efficient sweeping of the lawn, having all of the advantages of the rotary brush and also provides the advantages of blowing the cuttings and debris into a container where considerable self-compaction takes place and the container may be completely filled with the clippings. Such combined advantages have not heretofore been provided in an attachment for a lawn mower.

The invention contemplates an attachment for a power driven lawn mower and wherein power for rotating the brush and driving the blower are obtained from the motor on the mower.

BRIEF DESCRIPTION OF THE DRAWINGS

FIG. 2 is a side elevational view of the apparatus of FIG. 1;

FIG. 3 is a fragmentary vertical sectional view taken on the line 3—3 of FIG. 1;

FIG. 5 is a fragmentary sectional view taken on the line 5—5 of FIG. 2.

DESCRIPTION OF A PREFERRED EMBODIMENT

Figures 1, 4:
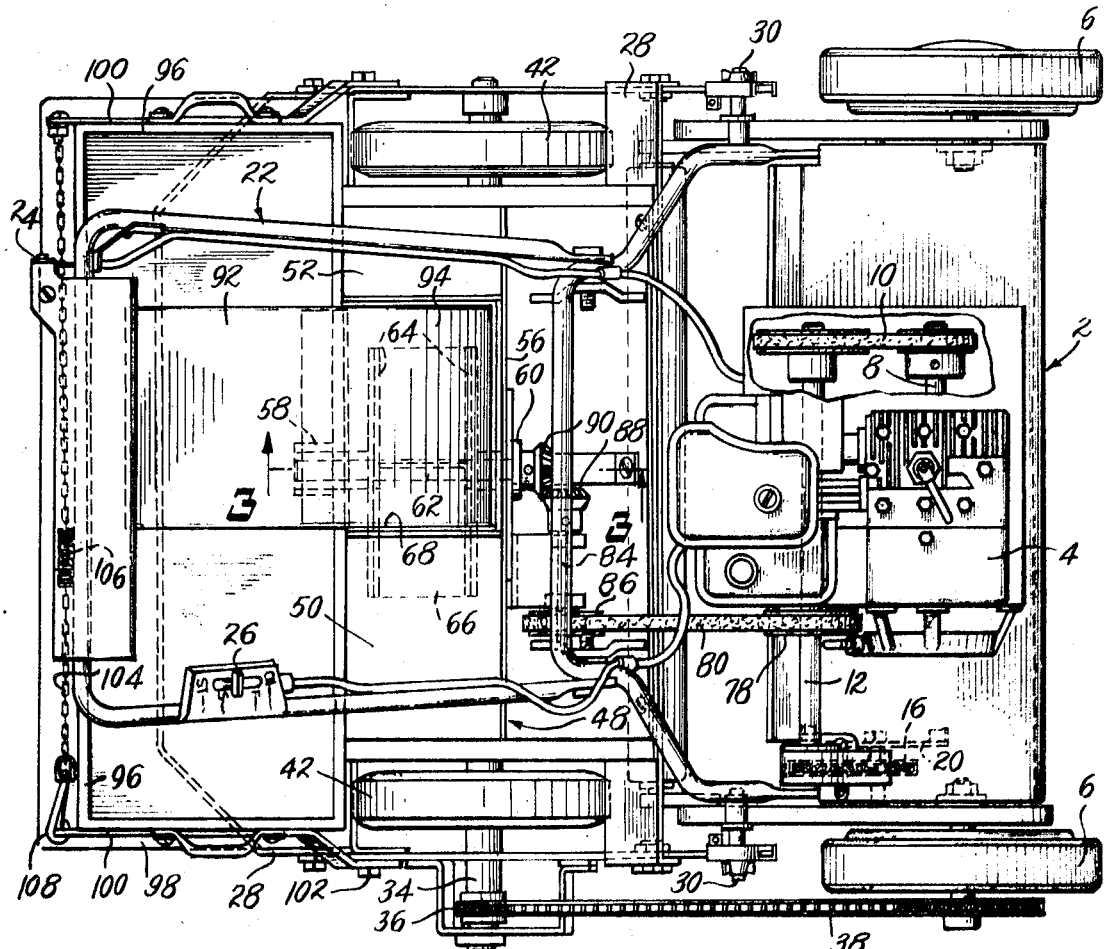
FIG. 1 is a top plan view of a lawn mower having the attachment of the present invention mounted thereon.
FIG. 4 is a vertical sectional view taken on the line 4—4 of FIG. 3.

In the drawings, numeral 2 designated generally a more or less conventional power driven reel-type lawn mower having a motor or engine 4 thereon to provide power for rotating a cutting reel and for propelling the mower along the ground by rotating wheels 6. Such mowers are conventional and well-known and need not be further described except to point out that, as shown, a power take-off shaft 8 (FIG. 1) drives through a belt 10 to an external shaft 12. One end of shaft 12 is provided with a drive sprocket 14 (FIG. 2) which drives through a chain 16 to a gear or sprocket 18 fixed to the shaft of the more or less conventional cutter reel indicated at 20. Through suitable gearing, not shown, the sprocket 18 also drives the wheels 6 to rotate in a clockwise direction, as viewed in FIG. 2, and thus propel the mower forwardly. A more or less conventional handle structure 22 is provided at the rear end of which suitable motor and drive controls 24 and 26 are mounted. The structure thus far described is conventional.

The present invention includes a substantially rigid frame 28 pivotally joined to the frame of the mower 2 on a transverse axis 30 so that the attachment may rise and fall relative to the mower to follow undulations of the ground. A rotary bristle brush indicated generally at 32 is carried by a shaft 34 journalled in the frame 8. One end of the shaft has a sprocket 36 fixed thereto and a chain 38 drivingly connects a sprocket 40 fixed to one of the wheels 6 to the sprocket 36 to thus rotate the brush 32. As seen in FIG. 2, the brush 32 is caused to rotate in a clockwise direction but at a much higher speed than the wheels 6. Freely journalled on the shaft 34 are supporting wheels 42 for the attachment.

The attachment also includes a transversely extending shroud or cowling member 44 extending downwardly behind the brush 32 and curved around the periphery thereof to approximately the point at which the brush engages the ground. The shroud or cowling member 44 directs cuttings and debris picked up by the brush 32 in an upward direction, as indicated by arrow 46 in FIG. 3. It is to be remembered that the speed of rotation of the brush 32 is sufficiently high so that the cuttings and debris following the path indicated by arrow 46 are moving at a substantial velocity, sufficient to carry them upwardly into a hood structure 48. As best shown in FIG. 4, the hood structure 48 comprises side walls 50 and 52, a back wall 54 and a front wall 56 (see FIG. 3). The walls described define a transversely extending relatively wide bottom opening so that debris or cuttings swept by the brush 32 are projected upwardly into the hood 48. As shown in FIG. 4, the side wall 52 of the hood extends more nearly vertical than the opposite side wall 50. The rear wall 54 and front wall 56 carry suitable bearings 58 and 60 in which a blower shaft 62 is journalled. On the shaft 62 there is fixed a blower having end plates 64 and generally radial vanes 66. As apparent from FIG. 4, the axis of the shaft 62 is so positioned that the periphery of the blower extends to a position quite close to the wall 50 but is spaced a substantial distance from the wall 52. By this relative arrangement the flow of air caused by the blower moves upwardly to the right of the blower rotor, as seen in FIG. 4, through a discharge opening 68 at the top of the hood 48.

The external shaft 12 previously described carries a pulley 78 which, through belt 80, drives a shaft 84 journalled on the front wall of the hood 48. The shaft 84 has fixed thereto a pulley 86 over which the belt 80 is trained and at its other end has fixed thereon a bevel gear 88 meshing with a bevel gear 90 fixed on the forward end of the blower shaft 62. It will be apparent that the blower is thus driven by the motor on the mower and in the direction indicated by the arrow in FIG. 4.

The upper or outlet opening 68 of the hood 48 leads into a duct 92 shaped as indicated in FIG. 2. The cuttings and debris blown by the blower through the outlet 68 are directed by a curved wall 94 of the duct 92 rearwardly and downwardly into the open top of a container 96 resting removably on a platform 98 provided on the frame 28. To retain the container 96 on the platform 98 against inadvertent displacement therefrom, a pair of bars 100 are loosely pivotally joined to the frame 28 at 102 and are joined at their upper ends by a chain 104 in which a tension spring 106 is included. One end of the chain 104 is provided with a spring clasp 108 whereby the chain may be disconnected from one of the bars 100 whereupon both bars are relieved of tight frictional engagement with the container 96 and the latter may be readily removed for emptying, and then replaced. The tension spring 106 tends to draw the bars 100 together and thus tightly frictionally engage the sides of the container 96.

As shown in FIGS. 2 and 3, the bearing 58 for the rear of the blower shaft 62 is of considerable axial extent and an opening 109 is provided in the front of the container 96 merely for the purpose of accommodating the bearing 58.

While a single specific embodiment of the invention has been shown and described herein, the same is merely illustrative of the principles involved.

I claim:

1. A lawn mower attachment for use with a motor driven lawn mower, comprising:

a wheel-supported frame including a rotatable lawn sweeper brush assembly;

means for pivotally connecting said frame behind the cutting apparatus of a lawn mower for vertical swinging movement relative thereto;

first transmission means for drivingly interconnecting said lawn mower to said brush assembly for rotating the same in a direction such that material swept thereby is moved upwardly by the rear of said brush;

a centrifugal blower mounted on said frame, and second transmission means for drivingly interconnecting said lawn mower to said blower;

a debris container on said frame;

a cowling disposed around the rear portion of said brush assembly and arranged to direct debris picked up thereby upwardly to said blower; and duct means on said frame arranged to direct debris from said blower into said container.

2. A lawn mower attachment as defined in claim 1 wherein said cowling is arranged to direct debris upwardly from the rear of said brush assembly;

a hood structure on said frame over said brush assembly, open at its lower end to receive said debris, and having upwardly converging side walls extending to an upper outlet opening;

said blower being journalled for rotation within said hood structure;

said blower comprising a rotor having generally radial vanes, said rotor being rotatable about a fore-and-aft axis laterally offset from the central axis of said outlet opening with its periphery closely adjacent the converging side wall extending to the nearest side of said outlet opening.

3. A lawn mower attachment as defined in claim 2 wherein said brush assembly extends transversely across the path of movement thereof, said hood structure having substantially vertical front and rear walls.

4. A lawn mower attachment as defined in claim 2 wherein said frame includes a platform means rearwardly of said hood structure and brush assembly, said debris container being an open-top container seated on said platform means and said duct means being arranged to direct debris downwardly into the open top thereof.

5. A lawn mower attachment as defined in claim 4 wherein said debris container is removably seated on said platform means, and selectively releasable holding means holding said container on said platform means against inadvertent displacement therefrom.

* * * * *